United States Patent [19]

Ha et al.

[11] Patent Number: 5,769,934
[45] Date of Patent: Jun. 23, 1998

[54] METHOD FOR PRODUCING MICROCRYSTALLINE CELLULOSE

[75] Inventors: Ewan Y. W. Ha, Twin Falls, Id.; Carol D. Landi, Hamilton, N.J.

[73] Assignee: FMC Corporation, Philadelphia, Pa.

[21] Appl. No.: 783,776

[22] Filed: Jan. 15, 1997

[51] Int. Cl.$^6$ .............................. C08L 1/02; C08B 15/00
[52] U.S. Cl. ........................................... 106/162.8; 536/56
[58] Field of Search ............................ 106/162.8; 536/56

[56] References Cited

U.S. PATENT DOCUMENTS

| | | |
|---|---|---|
| 1,655,618 | 1/1928 | Mason . |
| 2,978,446 | 4/1961 | Battista et al. . |
| 3,023,104 | 2/1962 | Battista . |
| 3,141,875 | 7/1964 | Battista et al. . |
| 3,146,168 | 8/1964 | Battista . |
| 3,539,365 | 11/1970 | Durand et al. . |
| 3,667,961 | 6/1972 | Algeo . |
| 4,461,648 | 7/1984 | Foody . |
| 4,634,470 | 1/1987 | Kamide et al. ............ 106/162.1 |
| 4,645,541 | 2/1987 | DeLong . |
| 5,011,701 | 4/1991 | Baer et al. . |
| 5,123,962 | 6/1992 | Komuro et al. . |
| 5,543,511 | 8/1996 | Bergfeld et al. . |

FOREIGN PATENT DOCUMENTS

| | | |
|---|---|---|
| 1096374 | 2/1981 | Canada . |
| 1141376 | 2/1983 | Canada . |
| A2-0 248 252 A1 (11) | 12/1987 | European Pat. Off. . |
| 1796632 A1 (11) | 2/1993 | U.S.S.R. . |
| 1792942 | 7/1993 | U.S.S.R. . |

OTHER PUBLICATIONS

E.J. McGinley et al., "Application of Microcrystalline Cellulose", *Gums and Stabilizers for the Food Industry,* vol. 5, Pergamon, Oxford, U.K., pp. 405–414 (1989).

O.A. Battista, "Hydrolysis and Crystallization of Cellulose," *Industrial and Engineering Chemistry* 42(3):502–507 (Mar. 1950).

*Primary Examiner*—David Brunsman
*Attorney, Agent, or Firm*—Polly E. Ramstad; Ian R. Silverman

[57] ABSTRACT

A method for producing microcrystalline cellulose by the steps of subjecting a cellulose source material to steam explosion treatment, extracting the steam treated cellulosic material to remove hemicellulose and lignin, and recovering microcrystalline cellulose that is substantially colloidal in particle size and essentially free of fibrous cellulose.

35 Claims, No Drawings

METHOD FOR PRODUCING MICROCRYSTALLINE CELLULOSE

TECHNICAL FIELD

This invention relates to a process for producing microcrystalline cellulose from a cellulose source material and, more particularly, to the production of microcrystalline cellulose of colloidal particle size.

BACKGROUND ART

Microcrystalline cellulose is a well-known material that finds widespread use as an adjuvant in pharmaceuticals, e.g., as a tableting aid, and in foods, e.g., as a stabilizer or fat replacement. Microcrystalline cellulose, also called cellulose crystallite aggregates, is sometimes referred to as level off DP (degree of polymerization) cellulose, a term that originated with O. A. Battista in "Hydrolysis and Crystallization of Cellulose," *Industrial and Engineering Chemistry*, 42, pp. 502–507 (1950). U.S. Pat. Nos. 2,978,446 (Battista et al.), 3,023,104 (Battista) and 3,146,168 (Battista et al.) describe the acid hydrolysis of purified cellulose to make level off DP cellulose and its use in food and pharmaceutical applications.

Microcrystalline cellulose is a highly crystalline particulate cellulose consisting primarily of crystallite aggregates obtained by removing amorphous (fibrous cellulose) regions of a purified cellulose source material by hydrolytic degradation, typically with a strong mineral acid such as hydrogen chloride. The acid hydrolysis process produces a microcrystalline cellulose of predominantly coarse particulate aggregates, typically having a mean size range of about 15 to 40 microns.

The acid hydrolysis process originally described by Battista is currently still a preferred method of producing microcrystalline cellulose, using a purified cellulose source material such as purified wood pulp or cotton linters. U.S. Pat. No. 5,543,511 of Bergfeld et al., however, describes an alternative to the traditional acid hydrolysis, in which hydrolysis of an aqueous slurry of purified cellulose is carried out in a pressurized reactor. The microcrystalline cellulose exemplified in these references is typically prepared from purified cellulose sources.

The prior art teaches that non-purified cellulose source material like lignocellulose may be processed by a steam explosion treatment to increase the availability of the cellulose component therein. The steam explosion process was originally described by Mason in U.S. Pat. No. 1,655,618 as a means for defibration of a cellulosic raw material. A non-purified cellulosic material, e.g., lignocellulose, is subjected to high pressure steam in a pressurized reactor, and the steam pressure is then rapidly released, leading to sudden decompression of the cellulose material and its explosive ejection from the reactor through a small opening that promotes separation of the component parts of the lignocellulose.

An acid hydrolysis process for the production of a microcrystalline cellulose that utilizes steam explosion is described by DeLong in U.S. Pat. No. 4,645,541. The lignocellulose raw material is steam treated in two steps, with the steam treated lignocellulose from the first step being extracted to recover a low degree of polymerization (DP) cellulose that is then impregnated with a strong mineral acid to effect hydrolysis of the cellulose into microcrystalline cellulose during the second steam treatment.

An improvement in the DeLong process is described in U.S.S.R. Invention Certificate 1,792,942, dated Oct. 10, 1990, in which a lignocellulose material is first subjected to a steam explosion treatment and the cellulose component is subsequently hydrolyzed with a strong acid to make microcrystalline cellulose. Ground lignocellulose material is first subjected to steam at 205°–250° C. for 1 to 15 minutes and then exploded from the reactor. After extraction steps with water and with a lignin solvent and a bleaching step, the cellulosic component is hydrolyzed with strong hydrochloric acid to recover microcrystalline cellulose. If the acid hydrolysis step is omitted, grinding of the bleached cellulose component yields powdered cellulose instead of microcrystalline cellulose.

In these prior art processes, the steam treatment alone does not yield microcrystalline cellulose; conventional acid hydrolysis of the cellulose component of the lignocellulose is required to produce microcrystalline cellulose.

Many pharmaceutical and food end use applications for microcrystalline cellulose require the use of a colloidal microcrystalline cellulose, having finely divided particles of microcrystalline cellulose. Colloidal microcrystalline cellulose is generally favored over non-colloidal microcrystalline cellulose for its superior dispersion stability and Theological properties in dispersions and for its unobjectionable sensory and textural (organoleptic) characteristics in food products.

Finely divided cellulose is described by Komuro et al. in U.S. Pat. No. 5,123,962 where the depolymerized cellulosic material is wet ground to make cellulose particles of 3 microns or less. Several cellulose depolymerization techniques are described, including acid hydrolysis and steam explosion, but there is no indication that level off DP microcrystalline cellulose (rather than powdered cellulose) or that colloidal microcrystalline cellulose was produced in any of the Examples.

A well-known colloidal microcrystalline cellulose is that described by Durancd et al in U.S. Pat. No. 3,539,365, in which microcrystalline cellulose prepared by the Battista acid hydrolysis procedure is subjected to mechanical attrition in an aqueous medium with carboxymethylcellulose present. The microcrystalline cellulose coprocessed with carboxymethylcellulose is recovered and dried to yield a redispersible microcrystalline cellulose with colloidal properties. Another approach for preparing a finely divided microcrystalline cellulose product useful in food applications is described by Baer et al in U.S. Pat. No. 5,011,701 which describes high shear fragmentation of microcrystalline cellulose in an aqueous medium, in the absence of gums that prevent recrystallization of the microcrystalline cellulose. The resulting microcrystalline cellulose of Baer et al. is not dried but is used to make reduced fat pourable or viscous dressings.

The present invention provides a process for the preparation of microcrystalline cellulose by steam explosion treatment of a cellulose source material, without the need for conventional acid hydrolysis as a supplement to steam treatment. This invention also provides a process for the preparation of colloidal microcrystalline cellulose via a steam explosion treatment procedure.

DISCLOSURE OF THE INVENTION

According to one aspect of the present invention, microcrystalline cellulose is produced by a process of introducing a cellulose source material in divided form into a pressurizable reactor; subjecting the cellulosic material in the reactor to a steam explosion treatment, by contacting the cellulosic material with pressurized steam at a temperature of at least about 170° C. for a period of time sufficient to hydrolyze the cellulosic material, the temperature and time being sufficient to provide a depolymerized cellulosic material containing microcrystalline cellulose having a level off degree of polymerization, and thereafter explosively releasing the steam pressure when the level off degree of polymerization is reached; extracting the steam exploded cellulosic material to remove hemicellulose and to remove lignin; and recovering microcrystalline cellulose that is substantially colloidal in particle size and that is essentially free of fibrous cellulose.

Another aspect of the invention comprises attriting the steam exploded and extracted cellulosic material under high shear, prior to recovery of the microcrystalline cellulose. Still another aspect of the invention is coprocessing the steam exploded and extracted cellulosic material under high shear with a hydrocolloid or a surfactant to recover a colloidal microcrystalline cellulose that is coprocessed with hydrocolloid or surfactant.

The cellulose source material (or "cellulosic material" as it is also called in this disclosure) used in this invention is preferably a lignocellulosic material, ie., containing cellulose, hemicellulose and lignin. Lignocellulosic materials are readily available from a wide spectrum of natural sources.

Wood chips or wood fragments from various tree species are a preferred cellulose source material. Wood cellulose sources may include soft woods, e.g., coniferous trees such as pine, spruce, fir and the like, and hardwoods, e.g., deciduous trees such as aspien, birch, maple and the like.

Other lignocellulosic materials such as annual plant growth materials, which are often considered as waste byproducts, may also be used as the cellulose source material in the present invention. Such cellulose source materials include corn, soy and oat hulls; corn stalks; corn cobs; bagasse; and wheat, oat, rice and barley straw.

It is important to recognize that the cellulose source material generally used in this invention is not a purified cellulose pulp. However, cellulose source materials that have been purified or that are naturally high in cellulose, e.g., cotton (including cotton linters) or regenerated cellulose, can be used in this invention with satisfactory results. Purified cellulose pulp typically contains a high content of $\alpha$-cellulose and is essentially free of lignin and is relatively low in hemicellulose ($\beta$- and $\gamma$-cellulose) so the lignin and hemicellulose extraction steps of this invention may be unnecessary with such pulp.

The cellulose source material, if not naturally in a divided state, e.g., as with oat, soy and corn hulls, must be reduced to a divided form, e.g., in the case of wood-based cellulose source materials. The divided form or state may be chips, shavings, fragments, sawdust and other equivalent forms that are at least coarsely divided, if not more finely divided. Fine grinding or comminution of the cellulose source material is generally unnecessary. The divided form of the cellulose source material is intended to provide sufficient surface area during the steam explosion treatment to promote efficient contact of the steam with the cellulose source material during such treatment. It should be recognized that the degree of fineness of the divided form of the cellulose source material is unrelated to the particle sizing of microcrystalline cellulose ultimately obtained in the process of this invention, so no direct benefit is obtained in that regard from use of a finely ground cellulose source material.

The main components of the cellulose source materials described above are generally, in decreasing order of abundance, cellulose, hemicellulose and lignin. Cellulose and hemicellulose are both carbohydrates, cellulose (sometimes referred to as $\alpha$-cellulose) being a linear polysaccharide with 6 carbon units ($\beta$-1,4-linked D-glucose) and hemicellulose (sometimes referred to as $\beta$- and $\gamma$-cellulose) being a polysaccharide with 5 carbon units (xylose). The hemicelluloses are generally much shorter polymers than the cellulose. Lignin is an aromatic polymeric material, phenolic in nature, whose exact formula is unknown. Lignin serves as a natural binder for the cellulose fibers in the cellulose source material.

The cellulose component in the cellulose source material typically contains fibrous cellulose having millions of microfibrils. The microfibrils contain amorphous regions (sometimes called the paracrystalline regions), which are flexible masses of cellulose chains, and crystalline or crystallite regions, which are tight bundles of cellulose chains in a rigid linear arrangement. Microcrystalline cellulose is obtained from the crystallite cellulose regions of the cellulose source material. The cellulose polymer component has varying degrees of polymerization (also referred to as DP) which refers to the number of monomeric units in a polymer molecule, depending on the source material. Typical DP values are about 1500 to about 2000 for wood pulp and about 3000 for cotton linters. Traditional acid hydrolysis of cellulose source materials typically not only frees the crystalline portion of the cellulose but also degrades and solubilizes the amorphous regions of the fibrous cellulose, yielding microcrystalline cellulose as the residual solid product. Hydrolysis of cellulose, if and when the reaction is carried out to completion, yields glucose.

In the process of this invention, the production of microcrystalline cellulose in good yields and of high purity, i.e., essentially free of fibrous cellulose, is ensured by precise control of the DP of the cellulose source material during the steam explosion treatment. The steam explosion treatment is controlled to produce a treated cellulosic material having a level off DP and is preferably controlled not only to reach a "true" level off DP, as described below, but also to terminate the steam explosion treatment at precisely the point at which a level off DP is first achieved and thereby minimize losses of microcrystalline cellulose by degradation of the crystallites into glucose, which is an unwanted effect of allowing the steam-induced cellulose hydrolysis to continue beyond this point.

In this invention, the term "true level off DP" reflects the fact that destruction of the fibrous cellulose structure has occurred as a result of the substantially complete removal of the amorphous regions originally present in the cellulose source material. "True level off DP" also means that a steady state DP is substantially achieved, particularly the point in time at which the true level off DP is first reached, after which there is essentially no change in the rate of decrease of degree of polymerization for the cellulose in the cellulose source material being treated.

In the process of this invention, a true level off DP for the cellulose in the treated cellulose source material is established when the rate of change in DP first or initially becomes essentially constant, i.e., when $d^2DP/dt^2 \approx 0$; the equivalent terms "level off degree of polymerization" and "level off DP" should be understood to have this meaning when used in the context of the present invention.

The crystallite cellulose that remains after the level off DP has been reached is of generally uniform chain length, particularly as compared to the original cellulose. The, existence of some variation in polymeric chain length of the crystalline cellulose makers it desirable to refer to an average DP, as well as an average level off DP.

The average degree of polymerization, including level off DP, may be determined via measurement of viscosities of the cellulose material in cuprammonium hydroxide solution, according to the method described by Battista in "Hydrolysis and Crystallization of Cellulose," *Ind. Eng. Chem.*, 42, pp. 502–507 (1950). Level off DP is determined by measuring the change in DP as a function of time during treatment, e.g., steam explosion treatment, of the cellulose source material, during which hydrolysis and/or depolymerization of the cellulose is effected.

In this invention, a true level off DP ensures not only that good yields of microcrystalline cellulose are achieved but also that such microcrystalline cellulose is essentially free of fibrous cellulose, i.e., fibrous cellulose content is less than about 5 wt % of the microcrystalline cellulose. It has been found that the presence of even small amounts of fibrous cellulose is deleterious to the production of colloidal microcrystalline cellulose and for this reason is avoided in the process of this invention. References to the essential absence of fibrous cellulose in the microcrystalline cellulose of this invention should be distinguished from fragments or particles of unreacted cellulose source material that may possibly be present after completion of the steam treatment process. Unreacted cellulose fragments are readily removable by sieving, screening or the like, because of their large size; their size is a factor that often accounts for such fragments not being completely reacted in the first place. The fibrous cellulose, on the other hand, that is problematic, if present in microcrystalline cellulose, is not readily removable by sieving or screening (but it is essentially completely removed in the process of this invention).

Although the prior art recognizes that depolymerization of the cellulosic material is necessary to obtain microcrystalline cellulose, the importance of targeting a true level off DP has not been heretofore realized or described in the prior art. Level off degree of polymerization, as defined and described by Battista in the context of acid hydrolysis of cellulosic materials, refers to a "relatively constant degree of polymerization reached after very prolonged mild conditions of hydrolysis or very short periods of drastic hydrolysis." Cellulose hydrolysis carried out under drastic or severe hydrolysis conditions may easily lead to low yields of microcrystalline cellulose, since prolonged hydrolysis treatment causes degradation of the microcrystalline cellulose into by-products such as glucose. As a consequence of this, many prior art methods for production of microcrystalline cellulose are operated in a manner that results in the presence of residual fibrous cellulose. For example, in prior art cellulose treatments, cellulose hydrolysis carried out under severe conditions is typically terminated si to the true level off DP being reached, as a means of maximizing yields of cellulose product. It should also be noted that the acid hydrolysis described by Battista and others typically utilizes a relatively pure cellulose, e.g., viscose rayon filaments, viscose grade cotton linters, purified wood pulps such as purified chemical (sulfite) wood pulps, and other equivalent purified pulps with high α-cellulose contents. Without the presence of hemicellulose and/or lignin in the cellulose source material, prior art acid hydrolysis of the cellulose to produce microcrystalline cellulose is accomplished in a relatively straightforward way, since depolymerization of the cellulose is not complicated by the presence of competing reactions with other components also being depolymerized or degraded.

The steam explosion treatment of this invention involves introducing the cellulose source material into a reactor directing steam under high pressure into the reactor to maintain the cellulosic material under high temperature and high pressure conditions for a relatively short period, and thereafter rapidly releasing the steam pressure in the vessel. The steam treatment of the cellulose source material is carried out under temperature and time conditions that effect hydrolysis or depolymerization of the cellulose component of the source material into microcrystalline cellulose that is characterized by having a level off DP and by being essentially free of fibrous cellulose.

High pressure vessels for carrying out the steam treatment of this invention are known. Equipment such as described by Mason in U.S. Pat. No. 1,655,618 or, more preferably, such as described by DeLong in U.S. Pat. No. 4,645,541 may be used, and these two U.S. patents are hereby incorporated herein by reference for their disclosures about pressurized vessels for carrying out steam explosion treatment of cellulose. The steam treatment of this invention may be carried out as a batchwise operation or as a continuous operation, depending on the equipment selected.

The cellulose source material is charged to the reactor in divided form and is preferably in a moist state. It is important to note, however, that the cellulose source material is not introduced or present in the reactor as a slurry, e.g., in an aqueous medium, since a slurry of cellulose source material is not amenable to steam explosion treatment and cannot readily be processed into the colloidal microcrystalline cellulose of this invention.

The temperature during the steam treatment is above about 170° C., and is preferably in the range of about 180° C. to about 350° C. and is more preferably in the range of about 200° C. to about 265° C.

The steam may be saturated steam or superheated steam. Steam that is saturated is preferred, since the presence of water vapor during the steam treatment of the cellulose facilitates its hydrolysis. The pressure of the steam is generally selected to provide the desired operating temperature in the steam treatment reactor for the treatment time being used.

The steam treatment time is the period during which the cellulose source material is exposed to the pressurized steam and, consequently, to the desired operating temperature. Steam treatment times may range from a few seconds to less than about one hour. Steam treatment times preferably range from about one minute to about 20 minutes. Treatment times of less than about 10 minutes are more preferred and less than about 5 minutes are most preferred.

The exposure time selected will depend on the pressure of the high pressure steam employed, which determines the operating temperature. To a lesser extent, the exposure time will depend on the identity or nature of the cellulose source material and its physical form, i.e., coarse sized material generally requiring longer exposure or treatment times; than finely divided material.

The combination of temperature and time parameters employed in the steam treatment is desirably selected to provide a "severity" factor within a specified range. "Severity" of the steam treatment may be defined by the general (exponential) formula (I):

$$S = [\text{time (minutes)}] \times \left[ e^{[\frac{Temperature(°C.)-100}{14.75}]} \right] \quad (I)$$

In general formula (I), e is the base of natural logarithms, i.e., e =2.718. The time and temperature parameters are desirably selected so that the logarithm (base 10) of severity "S" defined by general formula (I) is at least about 3.5, and preferably is in the range of about 3.5 to about 6, more preferably about 4 to about 5.

The following Table 1 shows steam treatment times for log severities within the more preferred range of 4 to 5, as a function of temperature. The values shown in the Table 1 were calculated using general formula (I).

TABLE 1

| Temperature (°C.) | Saturated Steam Pressure (psia) | Treatment Time (minutes) Log Severity | | | | | |
|---|---|---|---|---|---|---|---|
| | | 4 | 4.2 | 4.4 | 4.6 | 4.8 | 5 |
| 150 | 69 | 337 | 534 | 847 | 1342 | 2127 | 3371. |
| 175 | 130 | 62 | 98 | 155 | 246 | 391 | 619 |
| 180 | 146 | 44 | 70 | 111 | 176 | 278 | 441 |
| 200 | 226 | 11 | 18 | 28 | 45 | 72 | 114 |
| 225 | 371 | 2.1 | 3.3 | 5.2 | 8.3 | 13 | 21 |
| 250 | 578 | 0.4 | 0.6 | 1.0 | 1.5 | 2.4 | 3.8 |
| 265 | 739 | 0.1 | 0.2 | 0.3 | 0.6 | 0.9 | 1.4 |
| 275 | 862 | 0.07 | 0.1 | 0.2 | 0.3 | 0.4 | 0.7 |
| 300 | 1246 | 0.01 | 0.02 | 0.03 | 0.05 | 0.08 | 0.13 |
| 350 | 2398 | <0.001 | 0.001 | 0.001 | 0.002 | 0.003 | 0.004 |

The steam explosion treatment is preferably carried out as a single treatment step, although sequential steam treatments at the same or different conditions may also be used if desired. A noteworthy aspect of the steam explosion treatment of this invention is that it is readily accomplished without resorting to supplemental acid hydrolysis of the cellulose, for example, a prior art acid hydrolysis step requiring the addition of a strong acid such as hydrochloric acid.

The steam explosion treatment of the cellulose source material produces microcrystalline cellulose having a level off DP. The level off DP is less than the initial average degree of polymerization of the cellulose component in the source material prior to steam treatment. The average level off DP for the steam exploded cellulose is preferably in the range of about 100 to about 400, more preferably in the range of about 150 to about 300. It should be recognized that the level off DP value is dependent, in part, on the specific identity of the cellulose source material being used in the process.

More important than the absolute value of level off DP is the point during the steam explosion treatment at which the change in degree of polymerization becomes essentially constant. This point, for purposes of the present invention as noted above, is deemed to indicate when the "true" level off DP has been achieved. The operating parameters for the steam explosion treatment should be selected to achieve this true level off DP, and steam treatment should be terminated at this point to ensure that microcrystalline cellulose yield is not unnecessarily reduced from continued hydrolysis or degradation of the level off DP microcrystalline cellulose in the reactor.

The termination of the steam treatment is effected by the very rapid or "explosive" release of pressure in the reactor, with the reactor pressure preferably being dropped to ambient atmospheric pressure in a very short period of time. By "explosive" release is meant a pressure decrease occurring in a short time, which is typically only a few seconds. For example, in batchwise steam treatments, the explosive release of pressure is typically about 0.3 to about 4 seconds, but the exact time will depend on the design and size of the reactor. This "steam explosion" is desirably accomplished with the concomitant decompression and ejection of the steam treated cellulosic material from the reactor. Such explosive ejection or removal, particularly when effected through a small opening or die, facilitates the physical separation of the cellulose, hemicellulose and lignin components in the cellulose source material. As a result, the subsequent extraction to remove lignin and hemicellulose from the steam treated cellulose source material may be accomplished in an efficient manner, with good recovery of the desired microcrystalline cellulose product.

The extraction of hemicellulose and lignin from the steam exploded lignocellulose material is preferably carried out in two separate extraction operations. Separate extractions facilitate recovery of the hemicellulose and lignin components for further use, but such recovery is not part of the present invention.

The lignocellulosic material obtained from the steam explosion step described above is preferably extracted with a hot aqueous medium to remove the hemicellulose component of the cellulosic material. The hot aqueous medium may be water or may be a dilute alkali solution such as aqueous sodium hydroxide, e.g., 1% by weight NaOH. The temperature of the hot aqueous medium should be in the range of from about 50° C. to 100° C., preferably from about 60° C. to about 90° C. The extraction temperature selected normally affects the duration of the extraction step, with higher temperatures ordinarily requiring shorter times to solubilize the hemicellulose and accomplish the desired degree of hemicellulose extraction. The extraction may be carried out in conventional leaching or extraction equipment in one or several steps or stages, such as is typically used for leaching or extracting a soluble component from an insoluble solid material using a liquid solvent. By way of example, the steam exploded cellulose may be slurried with the hot aqueous medium in a tank, with agitation, to solubilize the hemicellulose, and thereafter the slurry may be pumped to a filter to separate the hemicellulose-containing extract from treated cellulose.

The extraction of lignin from the steam exploded cellulose may also be carried out in an analogous manner to that of the hemicellulose extraction, since both unit operations are essentially the same, being extractions in which a soluble component is leached with a solvent from the steam treated lignocellulose material.

The lignin extraction is preferably carried out with a lignin-solubilizing solvent, which is preferably an aqueous alkali solution. A preferred alkali solution is aqueous sodium hydroxide containing about 0.1% to about 5% by weight NaOH. However, other aqueous alkali solutions, e.g., containing other alkali metal hydroxides, alkaline earth metal hydroxides or aqueous ammonia, may also be used as the solvent for the lignin extraction. The temperature of the aqueous alkali solution is preferably elevated, within the range of about 50° C. to about 100° C., more preferably about 60° C. to about 90° C., which promotes rapid solubilization and extraction of the lignin component from the steam exploded cellulose. An alternative solvent for the lignin extraction step is an organic solvent capable of solubilizing the lignin component; an alcohol such as ethanol or methanol is preferred. An aqueous ethanol solvent containing about 80% to about 95% by weight ethanol is preferred as the alcohol solvent.

A further optional and preferred step in the process of this invention is a cellulose bleaching step. Steam exploded cellulose which has been extracted according to this invention may not be pure white in appearance, and such off-white color is an undesirable characteristic. Off-color steam exploded cellulose is preferably subjected to a bleaching step to provide microcrystalline cellulose having a white appearance that is desirable for many food and pharmaceutical end use applications. Bleaching as a unit operation is well known in the cellulose pulp and paper industry, and such conventional bleaching procedures may be utilized in the process of this invention. Suitable bleaching agents. include hydrogen peroxide and other peroxides, such as peracetic acid, chlorine and chlorine derivatives such as sodium hypochlorite, and combinations of these with other agents. Hydrogen peroxide is a preferred bleaching agent.

The steam exploded cellulose source material that remains after the hemicellulose and lignin extraction steps is essentially pure microcrystalline cellulose. Under the preferred steam treatment conditions, i.e., with log severities of about 4 to about 5, the microcrystalline cellulose recovered after the extraction steps is substantially colloidal in particle size.

For purposes of the present invention, "colloidal microcrystalline cellulose" is defined herein as being microcrystalline cellulose whose particle size distribution includes a substantial fraction, at least about one-third and preferably at least about on: half, of submicron size particles, having a particle size of less than about 1 micron and preferably less than about 0.6 micron, and having an overall particle size distribution with a mean particle size of less than about 10 microns and preferably less than about 1 micron.

In a preferred embodiment of this invention, the microcrystalline cellulose may be processed further in an attrition step with the application of mechanical force under high shear conditions, to produce a microcrystalline cellulose product with a particle size distribution that is even finer than that obtained after the extraction steps and having a larger proportion of submicron sized particles. This step is accomplished by attriting the steam exploded and extracted cellulose source material containing microcrystalline cellulose under high shear conditions to produce microcrystalline cellulose in which tie mean particle size is about one micron, i.e., 50% of the particles are less than one micron in size, and more preferably, in which the mean particle size is less than one micron. A key aspect of the invention, for ensuring that the attrition step efficiently provides microcrystalline cellulose of colloidal particle size with a large fraction of submicron sized particles, is the substantial absence of fibrous cellulose in the steam exploded and extracted cellulose source material that is subjected to attrition. The presence of fibrous cellulose in association with the microcrystalline cellulose subjected to attrition is avoided in this invention, as described earlier, by precise control of cellulose depolymerization, to reach a true level off DP during the steam explosion step.

The degree of particle size reduction effected during the attrition step of this invention should be sufficient to provide an attrited microcrystalline cellulose that not only is substantially colloidal in particle size but also contains a large fraction of submicron sized particles, as described above. It should be appreciated that the mean particle size refers to the individual crystallites of microcrystalline cellulose, which may reaggregate or agglomerate into clusters of crystallites during or after such attrition. Particle size measurement of the crystallites, if the latter are in aggregated or agglomerated form, must be made after such aggregates or agglomerates are redispersed into the individual crystallites, e.g., in an aqueous or other liquid medium as is conventionally employed in the measurement of microcrystalline cellulose particle size distributions.

The high shear attrition of the microcrystalline cellulose in the steam exploded cellulosic material is preferably carried out in the presence of an aqueous medium. The high shear attrition step may be carried out with an aqueous slurry or suspension containing the steam exploded cellulosic material. Preparation of the aqueous slurry may be accomplished, e.g., by slurrying the cellulosic material in water in a final wash step during extraction of the cellulosic material. The aqueous slurry preferably contains about 1% by weight to about 20% by weight microcrystalline cellulose and more preferably from about 3% by weight to about 10% by weight microcrystalline cellulose. Other liquid media could also be used for preparing the microcrystalline cellulose slurry or suspension that is subjected to attrition, e.g., an alcohol such as ethanol.

Alternatively, the attrition may be carried out with the steam exploded cellulosic material in the form of a wetcake, i.e., a moist cake from which most free water has been removed via centrifugation, filtration or the like. Such wetcake is preferably a never dried wetcake that is obtained after the extraction steps have been completed. The wetcake generally contains from about 40% by weight moisture to less than about 800% by weight moisture.

Apparatus for carrying out the attrition step under high mechanical shear is well known in the art and includes comminuting, milling or grinding equipment with rotary blades, cutters or hammers, including bead mills, and also includes low pressure augers. Homogenizers or other equipment that provide attrition under extremely high pressures may also be used to treat the steam exploded and extracted cellulosic material, to produce microcrystalline cellulose that is substantially colloidal in particle size.

The microcrystalline cellulose of this invention is preferably recovered as a dry, free-flowing particulate product that is microcrystalline cellulose of substantially colloidal particle size. The recovery and drying of the microcrystalline cellulose may be carried out by spray drying, fluidized bed drying, freeze drying, vacuum drying, flash drying, drum drying or by other conventional drying procedures. Some of these drying procedures, it will be noted, require that the microcrystalline cellulose first be separated from the aqueous slurry or other liquid suspension. This can be accomplished via conventional solids-liquid separation techniques, e.g., filtration, centrifugation or the like, to recover a microcrystalline cellulose wetcake suitable for drying.

In a preferred embodiment of this invention, the microcrystalline cellulose is coprocessed with a hydrophilic material, such as sodium carboxymethylcellulose (CMC), either during the attrition step or following the attrition step. The CMC, which is a preferred material, serves to control the reaggregation of colloidal sized particles of microcrystalline cellulose during the subsequent drying step. In addition to this "barrier" function, the CMC also serves as a dispersant to facilitate redispersion of the dried microcrystalline cellulose when the dry product is added to water or other aqueous medium.

Microcrystalline cellulose prepared via the Battista acid hydrolysis method has been coprocessed with CMC, as described by Durand et al. in U.S. Pat. No. 3,539,365, which is hereby incorporated herein by reference for its disclosures about microcrystalline cellulose coprocessed with CMC. In the present invention, preferred compositions contain microcrystalline cellulose coprocessed with CMC (or other materials, as described below) in relative amounts of from about 95:5 to about 70:30, more preferably from about 90:10 to about 80:20, all amounts being by weight.

Other hydrocolloids besides CMC may also be coprocessed with microcrystalline cellulose in a like manner, in lieu of CMC. Such hydrocolloids include xanthan gum, guar gum, locust bean gum, sodium alginate, starch, maltodextrin and the like. Other materials such as sugars, surfactants, sodium caseinate, and other similar food-grade ingredients may also be coprocessed with the microcrystalline cellulose in the same manner as with CMC.

The microcrystalline cellulose coprocessed with a hydrocolloid or another material is preferably dried as described above to recover a free flowing particulate product.

The present invention will now be described and explained further by reference to the following specific, illustrative, non-limiting Example.

EXAMPLE

This Example describes the processing of a cellulose source material, specifically, aspen wood chips, into the microcrystalline cellulose of this invention.

A single steam treatment batch was carried out as follows. About 1.5 lb (0.68 kg) aspen wood chips that had been shredded with a hammer mill to chips less than 0.25 in (0.64 cm) in size were loaded into a batch-operated pressurizable reactor to carry out the steam explosion treatment. The reactor consisted of a 0.83 ft$^3$ (23.5 l) pressure vessel equipped with a bottom discharge ball valve that was computer controlled to open after a desired time of steam contact. The reactor was also instrumented to record and log internal temperature and pressure.

Saturated steam was continuously introduced into the reactor until a pressure of 430 psig was attained, a period lasting less than two minutes. The pressure in the reactor was then cycled between 390 psig to 430 psig (2,689 Pa(gauge) to 2,965 Pa(gauge)) over a five minute period. Because of the cycling nature of the steam boiler, log10 severity (S) was calculated as 4.7 according to the following equation:

$$\log 10\,(S) = \sum_{1}^{n} (\exp((T(t) - 100)/14.75))\,\Delta t$$

where T(t)=temperature (°C.) at time t, Δt=time interval between temperature measurements, and n×Δt=total time (5 minutes).

The total quantity of steam introduced over the five minute steam treatment period was approximately 1.1 lb (0.50 kg); the steam-to-wood weight ratio was therefore approximately 0.72:1.

At the end of the five minute steam treatment period, the contents of the pressurized reactor were explosively released to atmospheric pressure and directed horizontally into a 7.9 ft$^3$ (224 l) cylindrical discharge vessel equipped with a bottom gate valve. The steam treated cellulosic material was then recovered from this vessel and retained for later extraction. The cellulosic material contained approximately 77.9% moisture.

To extract hemicellulose, 15 batches of steam treated cellulosic material processed as just described were combined for a total cake weight of 45.25 lb (20.6 kg). A volume of 20 gal (78 l) water was added to the cake and agitated in a reactor. The material was heated to 60° C. and maintained at this temperature for 15 minutes. The slurry was then drained to buckets and filtered in a vacuum filter. The material filtereds relatively rapidly. This process was repeated two additional times. The average cake moisture at the end of each aqueous extraction was 82.1%.

To extract lignin, the aqueous extracted material was reslurried in 20 gal (78 l) water to which sufficient NaOH (0.304 kg) had been added to produce a concentration of 0.1N NaOH. In the same manner as described for the hemicellulose extraction, the slurried material was agitated and heated to 60° C. and held for 15 minutes. The slurry was drained and vacuum filtered, the filtration requiring about 30 to 40 minutes. This procedure was repeated two additional times, with the exception that the filter cake was washed with one cake volume of water in each of the two additional times. The average cake moisture at the end of each alkali extraction was 86.7%. The pH of the extracted material was 10.5.

To bleach the water and alkali extracted material, five separate portions of 0.486 kg wetcake were each reslurried in 3 l of tap water. A volume of 215 ml 30% $H_2O_2$ was added to each slurry, and the slurries were agitated at room temperature for 18 hours. After 18 hours, the slurries were adjusted to pHs ranging from 3 to 7 and vacuum filtered. Each sample was reslurried in 1.5 l water, and pH adjusted to 10.5. To each slurry, 215 ml 30% $H_2O_2$ was added, and the slurries were agitated for 18 hours. The pH of each slurry was adjusted to the same pH as in the first bleaching treatment, i.e., between 3 and 7, and then filtered. The filter cakes were washed with water to remove salts; the filtration rate was noted to be between 1 and 8 hours. A pH of 5 was determined to give the best results in flocculating the slurry solids for most efficient filtration.

The five filter cakes were combined, then charged to a 30 gal (117 l) reactor. The combined filter cakes were reslurried in 20 gal (78 l) water, and the pH adjusted to 10.5. A volume of 5 l of 30% $H_2O_2$ was added to the reactor. The pH was readjusted to 10.5, and the slurry was then held overnight with agitation for the final bleach. The pH was adjusted to pH 5.0 before filtering. The solid material so produced floated and separated to form a gel-like material, indicative of microcrystalline cellulose of colloidal particle size. The slurry was passed through a 10-mesh screen to remove a small amount of unreacted wood chips, estimated to be less than about 5 wt % of the total solids. The screened slurry was vacuum filtered, and the bleached solid material, which was creamy white in appearance, was collected.

Bleached microcrystalline cellulose prepared according to the procedure just described may be attrited under high shear and may be processed further as follows.

The bleached cellulosic filter cake may be passed through a low pressure auger in multiple passes to attrite the bleached cellulosic material, yielding a microcrystalline cellulose having a solids content of about 25 wt %. The microcrystalline cellulose mark then be coprocessed further with carboxymethylcellulose in the following procedure. Carboxymethylcellulose (CMC), e.g., Aqualon® 7LF CMC, sold by Hercules Incorporated, Wilmington, Del., is combined with the attrited microcrystalline cellulose (MCC) in an amount sufficient to provide a weight ratio of about 85:15 MCC:CMC and processed through the auger four more times.

To prepare a slurry suitable for spray drying, sufficient water may be added to the processed MCC-CMC mixture, which typically will have a solids content of about 25–30 wt %, to yield an aqueous slurry containing about 6 wt % solids. The slurry is mixed in a high speed, high shear mixer to obtain good dispersion of the solids.

Spray drying of the MCC/CMC slurry to obtain a free-flowing powder may be carried out, for example, in a 3-foot (91.4 cm) disk atomizer spray dryer, using an inlet temperature of about 190°–193° C. and outlet temperature of about 85°–109° C., with the slurry being maintained at about 80°–85° C. with mixing during the spray drying procedure. The resulting powder, having a moisture content of about 5 wt %, is screened through a 50 mesh U.S. standard sieve to remove oversize material.

A representative particle size distribution for the spray dried, coprocessed 85:15 MCC:CMC powder is shown in the following Table 2. For comparative purposes, the particle size distribution of Avicel® CL-611, a commercial colloidal MCC product containing 85:15 MCC:CMC (available from FMC Corporation, Philadelphia, Pa.) is also shown.

TABLE 2

| Sieve Size (U.S. Standard) | Amount Retained (weight %) | |
| --- | --- | --- |
| | Example | Avicel ® CL-611 |
| +70 | 0.1 | 0.03 |
| +140 | 0.3 | 2.3 |
| +230 | 0.7 | 17.6 |
| +270 | 0.6 | 17.4 |
| +325 | 27.5 | 13.6 |
| −325 | 70.7 | 50.0 |

These results show that the coprocessed MCC:CMC of this Example is a powder that has a finer particle size distribution than that of Avicel® CL-611. The dispersion characteristics of the spray dried coprocessed MCC:CMC of this Example may also be evaluated, as follows. A 2% by weight dispersion, prepared by slowly adding an appropriate amount of spray dried powder to water in a high speed mixer, e.g., a Waring blender, yields an initial viscosity of 93.5 cps and a viscosity of 390 cps after sitting undisturbed for 24 hours (measurements may be made with a Brookfield RVT viscormeter equipped with spindle no. 1 and operated at 20 rpm). These viscosity characteristics are comparable to those of Avicel® CL-611, a commercially-available colloidal microcrystalline cellulose.

The present invention may be embodied in other specific forms without departing from the spirit or essential attributes thereof and, accordingly, reference is made to the appended claims, rather than the foregoing specification, as indicating the scope of the invention.

What is claimed is:

1. A process for the production of microcrystalline cellulose consisting essentially of
   (i) introducing a cellulose source material in divided form into a pressurizable reactor;
   (ii) subjecting the cellulosic material in the reactor to a steam explosion treatment, by contacting the cellulosic material with pressurized steam at a temperature of at least about 170° C. for a period of time sufficient to hydrolyze the cellulosic material, the temperature and time being sufficient to provide a depolymerized cellulosic material containing microcrystalline cellulose having a true level off degree of polymerization of about 100 to about 400, and thereafter explosively releasing the steam pressure when the level off degree of polymerization is reached;
   (iii) extracting the steam exploded cellulosic material to remove hemicellulose and to remove lignin; and
   (iv) recovering microcrystalline cellulose that is substantially colloidal in particle size and that is essentially free of fibrous cellulose.

2. The process of claim 1 wherein the cellulosic material is subjected to a single steam explosion treatment step.

3. The process of claim 1 wherein the steam treatment time is about 1 minute to about 20 minutes.

4. The process of claim 1 wherein the temperature during the steam treatment is from about 180° C. to about 350° C.

5. The process of claim 1 wherein the steam explosion treatment is carried out under temperature and time conditions to have a logarithm of the severity, S, of the steam explosion treatment with a value of about 3.5 to about 6, where S is calculated as $$S = [\text{time (minutes)}] \times \left[ e^{[\frac{Temperature(°C.)-100}{14.75}]} \right]$$

6. The process of claim 5 wherein the logarithm of severity S of the steam explosion treatment has a value of about 4 to about 5.

7. The process of claim 5 wherein the time is about 1 minute to about 20 minutes.

8. The process of claim 5 wherein the temperature during steam explosion treatment is from about 180° C. to about 350° C.

9. The process of claim 5 wherein the logarithm of severity S of the steam explosion treatment has a value of 4.7 or more.

10. The process of claim 1 wherein the cellulose source material is a lignocellulose material.

11. The process of claim 10 wherein the cellulose source material is wood chips.

12. The process of claim 10 wherein the lignocellulose material is selected from the group consisting of hardwood, soft wood, corn hulls, soy hulls, oat hulls, corn stalks, corn cobs, bagasse, wheat straw, oat straw, rice straw and barley straw.

13. The process of claim 1 wherein the cellulose source material is selected from the group consisting of cotton and regenerated cellulose.

14. The process of claim 1 wherein the cellulose source material is not subjected to hydrolysis with a strong acid.

15. The process of claim 1 wherein the steam exploded cellulosic material is extracted with a hot aqueous medium to extract hemicellulose.

16. The process of claim 15 wherein the hemicellulose extraction step uses an aqueous medium at a temperature of from about 50° C. to about 100° C.

17. The process of claim 16 wherein the hot aqueous medium used in the hemicellulose extraction step is water.

18. The process of claim 1 wherein the steam exploded cellulosic material is extracted with a lignin-solubilizing solvent to remove lignin.

19. The process of claim 18 wherein the lignin extraction step uses an aqueous alkali solution or an alcohol solvent.

20. The process of claim 19 wherein the lignin extraction step uses an aqueous alkali solution that is aqueous sodium hydroxide.

21. The process of claim 1 wherein the recovered microcrystalline cellulose comprises at least about one-third submicron size particles and has a mean particle size of less than about 10 microns.

22. The process of claim 1 wherein the recovered microcrystalline cellulose has a mean particle size of less than about 1 micron.

23. The process of claim 1 wherein the microcrystalline cellulose has a level off degree of polymerization of from about 150 to about 300.

24. The process of claim 1 wherein the microcrystalline cellulose is recovered as a bleached product by bleaching the steam exploded and extracted cellulosic material.

25. The process of claim 1 wherein the microcrystalline cellulose is recovered as a dry free flowing product.

26. A process for the production of microcrystalline cellulose consisting essentially of (i) introducing a cellulose source material in divided form into a pressurizable reactor;

(ii) subjecting the cellulosic material in the reactor to a steam explosion treatment, by contacting the cellulosic material with pressurized steam at a temperature of at least about 170° C. for a period of time sufficient to hydrolyze the cellulosic material, the temperature and time being sufficient to provide a depolymerized cellulosic material containing microcrystalline cellulose having a true level off degree of polymerization of about 100 to about 400, and thereafter explosively releasing the steam pressure when the level off degree of polymerization is reached;

(iii) extracting the steam exploded cellulosic material to remove hemicellulose and to remove lignin;

(iv) attriting the steam exploded and extracted cellulosic material under high shear; and (v) recovering microcrystalline cellulose that is substantially colloidal in particle size and that is essentially free of fibrous cellulose.

27. The process of claim 26 wherein the microcrystalline cellulose is recovered as a bleached product by bleaching the steam exploded and extracted cellulosic material.

28. The process of claim 26 wherein the microcrystalline cellulose is recovered as a dry free flowing product.

29. A process for the production of microcrystalline cellulose consisting essentially of (i) introducing a cellulose source material in divided form into a pressurizable reactor;

(ii) subjecting the cellulosic material in the reactor to a steam explosion treatment, by contacting the cellulosic material with pressurized steam at a temperature of at least about 170° C. for a period of time sufficient to hydrolyze the cellulosic material, the temperature and time being sufficient to provide a depolymerized cellulosic material containing microcrystalline cellulose having a true level off degree of polymerization of about 100 to about 400, and thereafter explosively releasing the steam pressure when the level off degree of polymerization is reached;

(iii) extracting the steam exploded cellulosic material to remove hemicellulose and to remove lignin;

(iv) coprocessing the steam exploded and extracted cellulosic material under high shear with a hydrocolloid or a surfactant; and (v) recovering microcrystalline cellulose that is substantially colloidal in particle size and that is essentially free of fibrous cellulose.

30. The process of claim 29 wherein the cellulosic material is coprocessed with a hydrocolloid selected from carboxymethylcellulose, xanthan gum, guar gum, locust bean gum, alginate, starch and maltodextrin.

31. The process of claim 29 wherein the microcrystalline cellulose is recovered as a bleached product by bleaching the steam exploded and extracted cellulosic material.

32. The process of claim 29 wherein the microcrystalline cellulose is recovered as a dry free flowing product.

33. A process for the production of microcrystalline cellulose consisting essentially of (i) introducing a cellulose source material in divided form into a pressurizable reactor;

(ii) subjecting the cellulosic material in the reactor to a steam explosion treatment, by contacting the cellulosic material with pressurized steam at a temperature of at least about 170° C. for a period of time sufficient to hydrolyze the cellulosic material, the temperature and time being sufficient to provide a depolymerized cellulosic material containing microcrystalline cellulose having a true level off degree of polymerization of about 100 to about 400, and thereafter explosively releasing the steam pressure when the level off degree of polymerization is reached;

(iii) extracting the steam exploded cellulosic material to remove hemicellulose and to remove lignin;

(iv) attriting the steam exploded and extracted cellulosic material under high shear;

(v) coprocessing the steam exploded and extracted cellulosic material under high shear with a hydrocolloid or a surfactant, such coprocessing being carried out either concurrently with the attrition step or after the attrition step; and (vi) recovering microcrystalline cellulose that is substantially colloidal in particle size and that is essentially free of fibrous cellulose.

34. The process of claim 33 wherin the microcrystalline cellulose is recovered as a bleached product by bleaching the steam exploded and extracted cellulosic material.

35. The process of claim 33 wherein the microcrystalline cellulose is recovered as a dry free flowing product.

\* \* \* \* \*